US007878718B2

(12) United States Patent
Chung et al.

(10) Patent No.: US 7,878,718 B2
(45) Date of Patent: Feb. 1, 2011

(54) IMAGE PHOTOGRAPHING APPARATUS AND ROTATABLE GRIPPING UNIT OF SAME

(75) Inventors: Yeon-moo Chung, Seoul (KR); In-shik Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 384 days.

(21) Appl. No.: 11/677,684

(22) Filed: Feb. 22, 2007

(65) Prior Publication Data

US 2008/0063393 A1   Mar. 13, 2008

(30) Foreign Application Priority Data

Sep. 12, 2006   (KR) .................. 10-2006-0088169

(51) Int. Cl.
*G03B 17/02* (2006.01)
(52) U.S. Cl. .................. 396/424; 348/376; 396/502
(58) Field of Classification Search ............... D16/206, D16/242; 348/373, 376; 396/419–420, 423–424, 396/428, 535, 540; 16/429; 294/139
See application file for complete search history.

(56) References Cited

U.S. PATENT DOCUMENTS

| 2,679,196 | A | * | 5/1954 | Sochor et al. ............... 396/401 |
| 4,530,580 | A | * | 7/1985 | Ueda et al. .................. 396/425 |
| 4,959,729 | A | * | 9/1990 | Fukuda et al. .............. 348/375 |
| 4,963,904 | A | * | 10/1990 | Lee ............................ 396/423 |
| 5,043,822 | A | * | 8/1991 | Ichiyoshi et al. ............ 348/376 |
| 5,721,997 | A | * | 2/1998 | Powell et al. ................ 396/420 |
| 6,697,118 | B2 | * | 2/2004 | Zadok ........................ 348/375 |
| D502,200 | S | * | 2/2005 | Abe ........................... D16/206 |
| 6,942,400 | B2 | * | 9/2005 | Shibayama ................. 396/419 |
| 2007/0292125 | A1 | * | 12/2007 | Saxton ....................... 396/420 |

FOREIGN PATENT DOCUMENTS

| JP | 60218633 | A | * | 11/1985 |
| JP | 2-130165 | | | 10/1990 |
| JP | 05-083608 | | | 4/1993 |
| JP | 05207348 | A | * | 8/1993 |
| JP | 06311404 | A | * | 11/1994 |
| JP | 2005-94665 | | | 4/2005 |

OTHER PUBLICATIONS

Mullen—JVC JY-HD10 review dated Aug. 1, 2003. Retrieved online on Nov. 10, 2009.*
The Imaging Resource—Review of Pentax Optio MX Camera, dated Aug. 24, 2004. Retrieved online on Nov. 10, 2009.*

* cited by examiner

*Primary Examiner*—Clayton E Laballe
*Assistant Examiner*—Leon W Rhodes
(74) *Attorney, Agent, or Firm*—Stanzione & Kim, LLP

(57) ABSTRACT

An image photographing apparatus includes a main body, and a gripping unit rotatably disposed on the main body. The gripping unit includes a first member that protrudes from and is rotatably disposed on a side surface of the main body to adjust in a linear direction, and a second member fixed at approximate right angles to the first member. With this construction, a user can photograph while freely changing a position of her/his hand according a photographing angle that she/he wants to photograph at, in a position that a gripping state to the apparatus is held.

8 Claims, 6 Drawing Sheets

IMAGE PHOTOGRAPHING APPARATUS AND ROTATABLE GRIPPING UNIT OF SAME

CROSS-REFERENCE TO RELATED APPLICATIONS

This application claims the benefit under 35 U.S.C. §119 from Korean Patent Application No. 10-2006-0088169, filed on Sep. 12, 2006, in the Korean Intellectual Property Office, the entire content of which is incorporated herein by reference.

BACKGROUND OF THE INVENTION

1. Field of the Invention

The present general inventive concept relates to an image photographing apparatus.

2. Description of the Related Art

As illustrated in FIG. 1, a general image photographing apparatus has a hand grip 20 fixed and disposed to one side surface of a main body 10 in a form capable of wrapping the back of a user's hand to allow the user to easily grip the image photographing apparatus in a photographing operation.

As illustrated in FIG. 2A, in a high angle photographing operation, the general image photographing apparatus as described above is grasped by inserting the user's hand 1 into the hand grip 20 in the form that the back of the user's hand is wrapped therein and then grips the main body 10. To take a comfortable posture while changing into a low angle photographing operation from the high angle photographing operation as illustrated in FIG. 2B, the user should remove her/his hand 1 from the hand grip 20 and then again grasp the hand grip 20. Furthermore, to change into the high angle photographing operation from the low angle photographing operation, the user should also remove her/his hand 1 from the hand grip 20 and then again grasp the hand grip 20. Accordingly, a problem may occur in that when the user changes the photographing angle of the image photographing apparatus, it is difficult to continuously photograph due to the troublesome motions the user must perform, as described above. Also, a problem may occur in that a sense of the user's hand 1 of coming in close contact with the main body 10 is deteriorated, and the image photographing apparatus may be difficult to carry around because while the image photographing apparatus is not in use, the hand grip 20 dangles and causes interferences.

SUMMARY OF THE INVENTION

The present general inventive concept provides an image photographing apparatus, which allows a user to photograph freely while changing a position of her/his hand according a photographing angle that she/he wants to use while grasping or gripping the apparatus.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept are achieved by providing an image photographing apparatus including a main body and a gripping unit rotatably disposed on the main body.

The gripping unit may include a first member to protrude from and is rotatably disposed on a side surface of the main body, and a second member fixed at approximate right angles to the first member.

The gripping unit may include a rotary plate rotatably disposed on a side surface of the main body, a first member rotatably hinged on the rotary plate, and a second member hinged to the first member to be rotatable at approximate right angles with respect thereto.

The first member can be formed to adjust a length thereof in a straight direction.

The gripping unit may include a rotary plate rotatably disposed on a side surface of the main body, and a gripping band connected to the rotary plate.

The foregoing and/or other aspects and utilities of the present general inventive concept are also achieved by providing an image photographing apparatus including a main body and a rotatable plate disposed at a side of the main body in which a gripping unit can be connected to grip the main body at a plurality of rotation angles.

The image forming apparatus may further include a gripping unit having a first part that connects to the rotatable plate at a first end thereof and a second part which is connected at a first end thereof to a second end of the first part via a hinge member to wrap the second part around a user's fingers.

The foregoing and/or other aspects and utilities of the present general inventive concept are also achieved by providing an image photographing apparatus including a main body and a rotatable device connected to and extending away from the main body such that the rotatable device can be disposed between two fingers of a user while the rotatable device is rotatable with respect to the main body.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
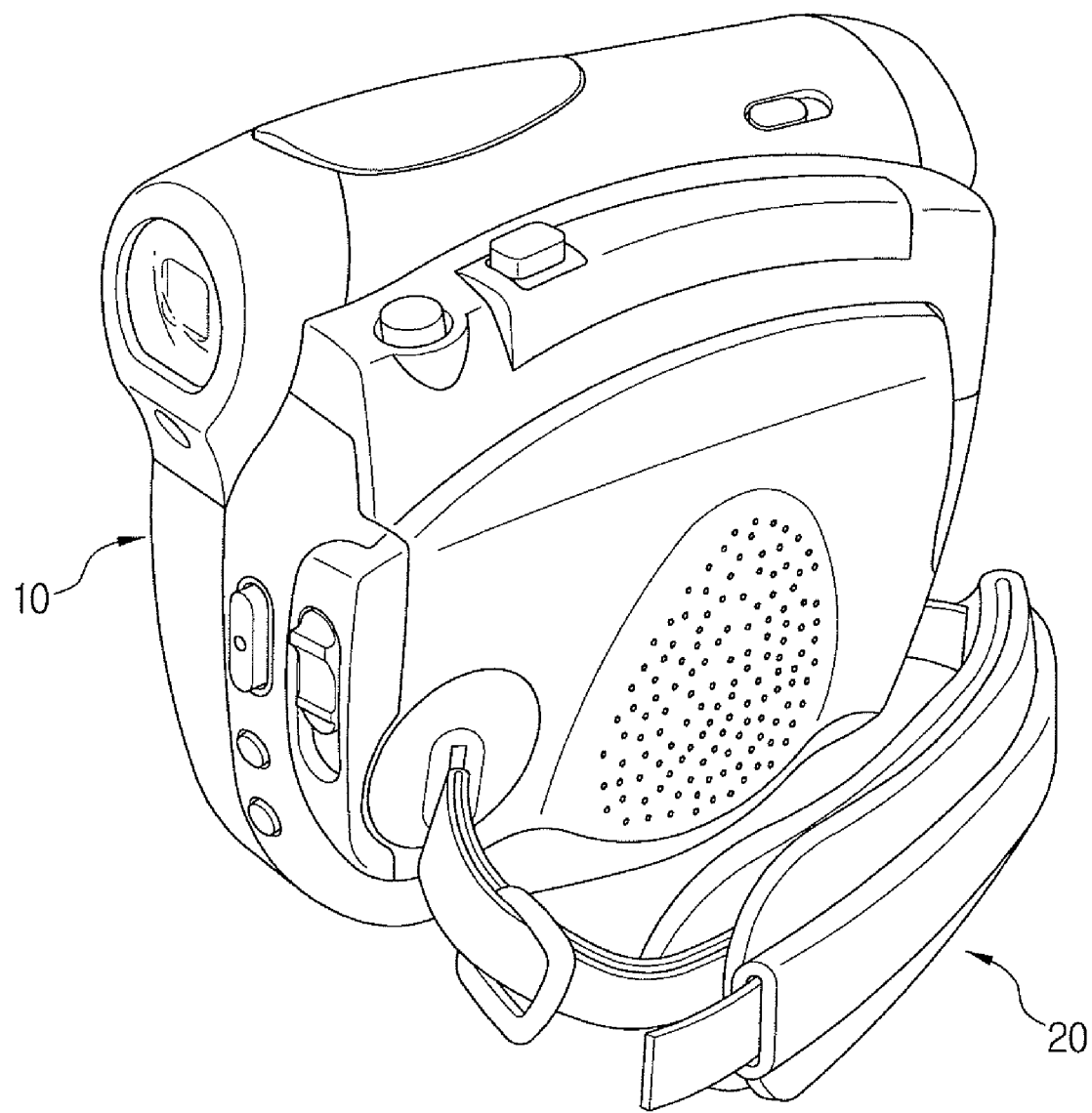
FIG. 1 is a perspective view exemplifying a general image photographing apparatus.
Figure 2A:
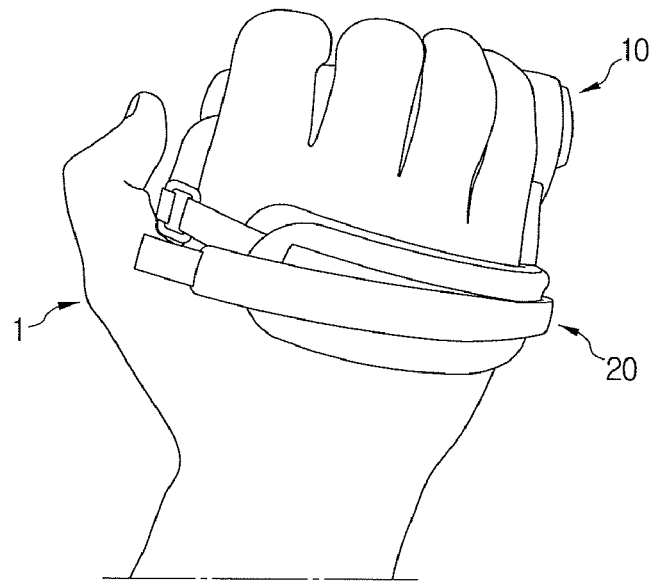
FIGS. 2A and 2B are views exemplifying user's motions according to photographing angles of the general image photographing apparatus, respectively.
Figure 2B:
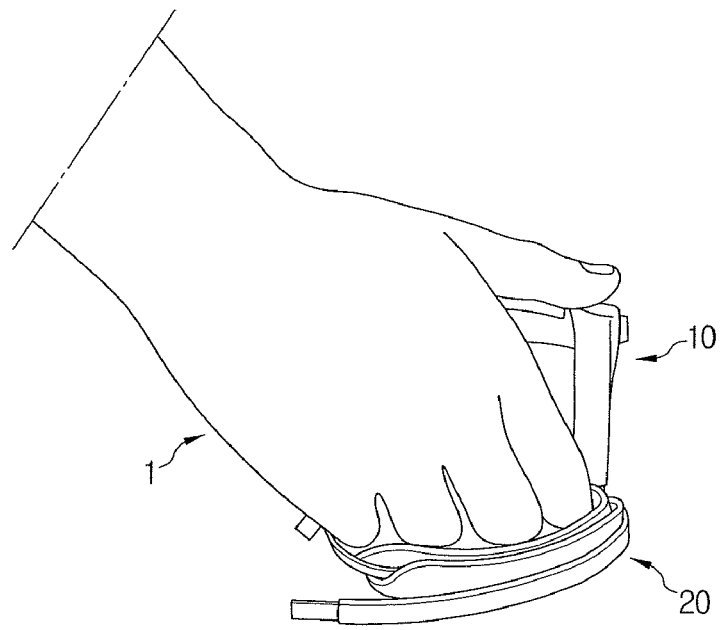
Figure 3A:
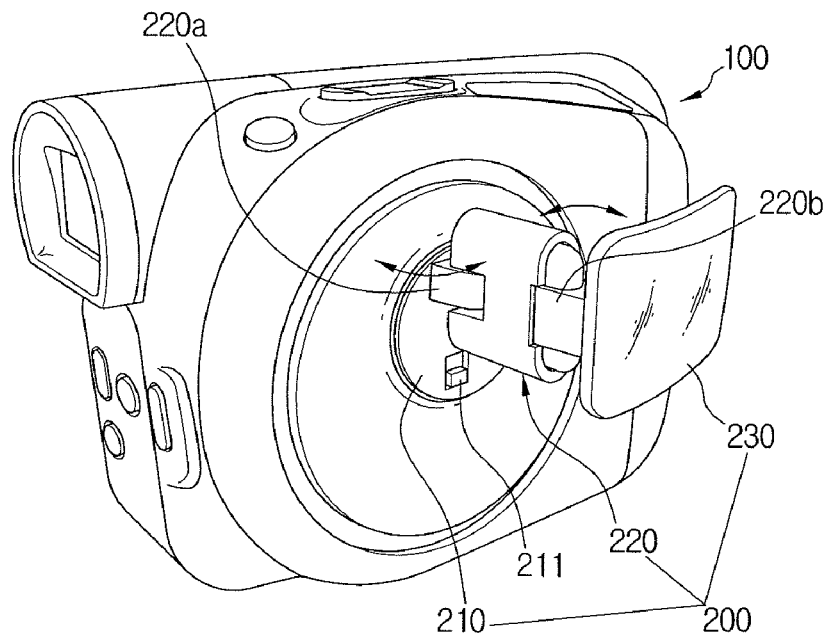
FIGS. 3A through 3D are perspective views exemplifying an image photographing apparatus according to an exemplary embodiment of the present general inventive concept.
Figure 3B:
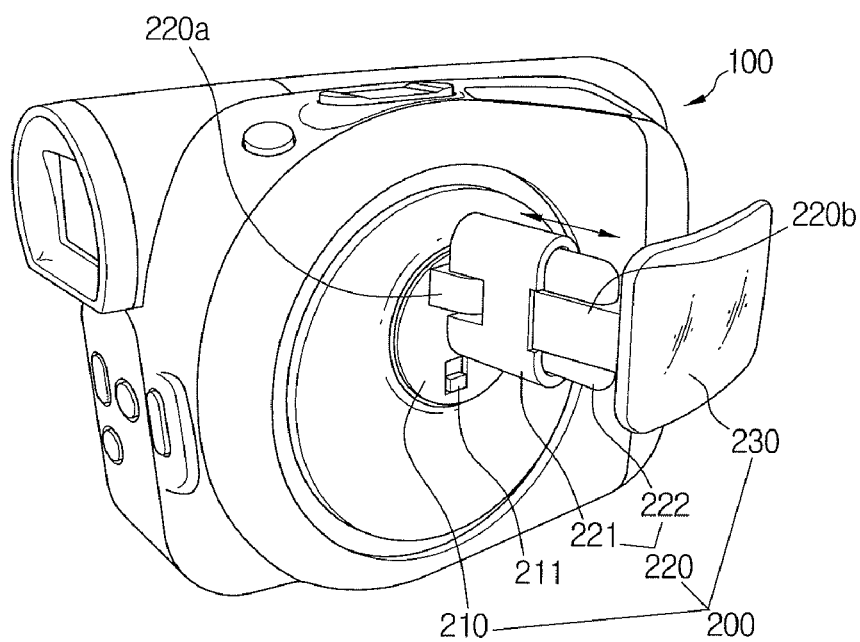
Figure 3C:
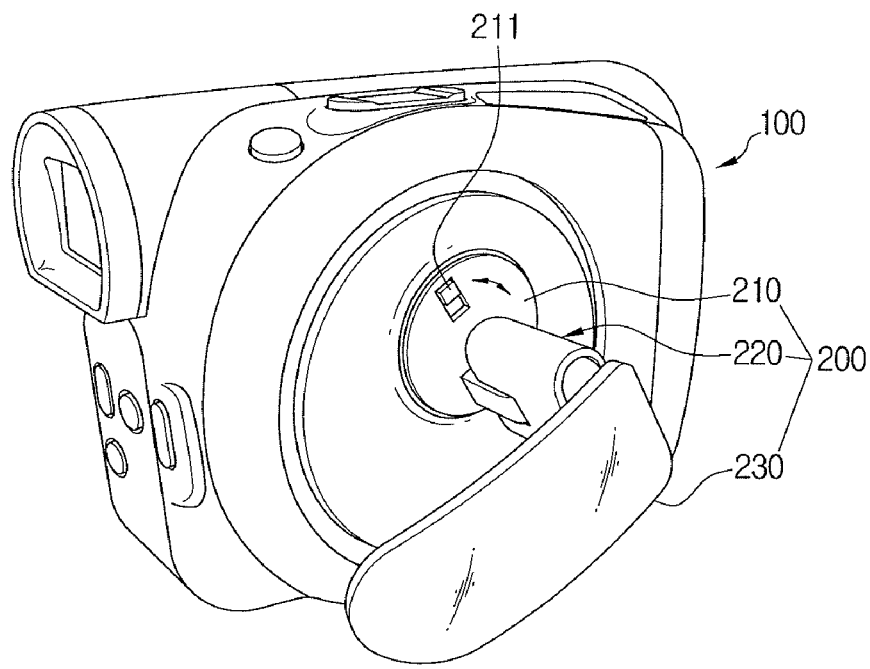
Figure 3D:
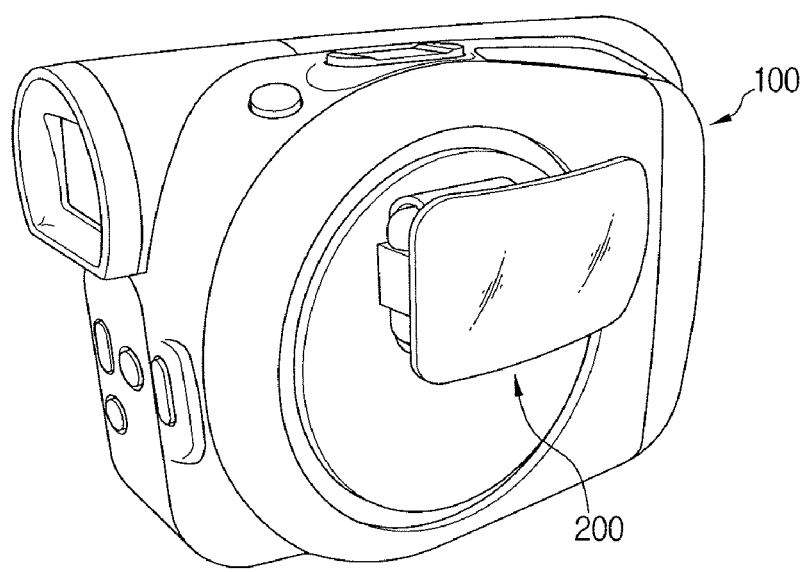

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIGS. 3A through 3D are perspective views exemplifying an image photographing apparatus according to an exemplary embodiment of the present general inventive concept.

As illustrated in FIGS. 3A through 3D, the image photographing apparatus according to this exemplary embodiment includes a main body 100, and a griping unit 200 rotatably disposed on the main body 100.

The main body 100 is equipped with a camcorder, a motion image camera, and/or a still camera, which are known in the art.

The gripping unit 200 has a rotary plate 210, a first member 220, and a second member 230.

The rotary plate 210 is rotatably disposed on one side surface of the main body 100. The rotary plate 210 can be disposed a rotary axle (not illustrated), which is an axle that is coupled with the main body 100. The rotary axle can have a gear structure, so that the rotary plate 210 is rotated in intervals of a predetermined angle with respect to the main body 100. The rotary plate 210 can have a thin disk shape. However, the rotary plate 210 is not limited to this shape, but can be formed in a polygonal plate or the like.

The first member 220 has one end coupled by a hinge 220a to the rotary plate 210. The first member 220 can be hinged and coupled to be eccentric with respect to the rotary axle of the rotary plate 210. The first member 220 can be made of a rod in the form of a circle, an oval or a polygon having a diameter small enough to be interposed between two fingers, for example, the forefinger 1a and the middle finger 1b (see FIG. 4A). The first member 220 can be formed to adjust a length thereof in a straight direction. For example, the first member 220 can have at least two-stepped structures 221 and 222, so that it can be telescoped to extend like an antenna. The first member 220 can be formed to be fixed at a desired length after adjusting the length thereof. Also, the first member 220 can be formed so that when it is extended from the main body 100 to allow a user to grasp or grip the image photographing apparatus, the first member 220 is automatically locked by a locking device (not illustrated) provided in the main body 100, and thus can be held in an extended state without being telescoped, and when a lock releasing button 211 is pushed, the first member 220 is unlocked and telescoped.

The second member 230 can have one end coupled by a hinge 220b to the other end of the first member 220 to be rotatable at approximate vertical angles with respect thereto. The second member 230 can be made of a plate having a predetermined area to wrap across the middle finger 1b, the ring finger 1c and the little finger 1d (see FIG. 4A). The second member 230 can be formed of a curved shape having a predetermined curvature at an inner side thereof. The inside of the second member 230 can be formed of a steel material with tension and strength, so that the fingers are supported in a good position on the main body 100, and a surface of the second member 230 can be formed of a rubber material, so that the fingers do not slip and so that the second member 230 is pleasant to the touch in a gripping operation.

In a use, the image photographing apparatus according to the above exemplary embodiment constructed as described above is operated to rotate the first and the second members 220 and 230 of the gripping unit 200 telescoped on the one side surface of the main body 100, and thus to extend them, respectively.

Figure 4A:
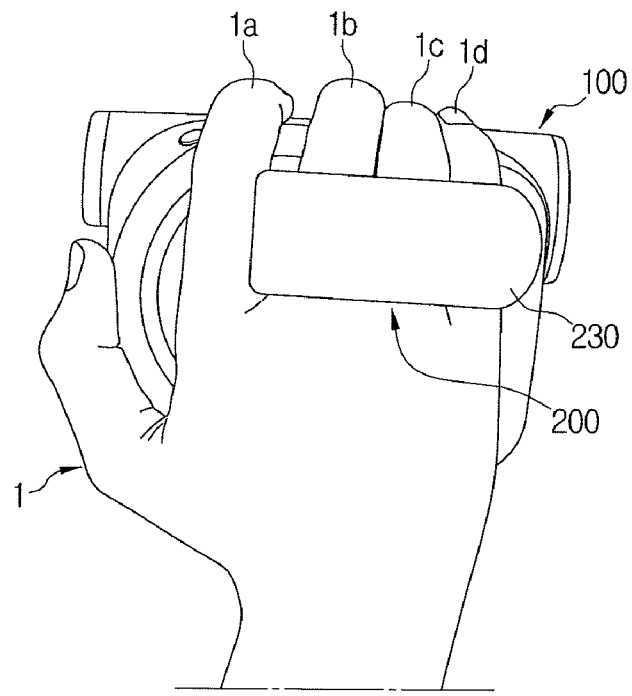
FIGS. 4A and 4B are views exemplifying user's motions according to photographing angles of the image photographing apparatus according to the exemplary embodiment of the present general inventive concept, respectively.

As illustrated in FIG. 4A, in a high angle photographing operation (i.e., at an eye level), the main body 100 is gripped so that the first member 220 is interposed between the forefinger 1a and the middle finger 1b and the second member 230 wraps across the middle finger 1b, the ring finger 1c and the little finger 1d. At this time, the first member 220 is fixed after adjusting a length thereof according to thicknesses of the fingers. As a result, a sense of the fingers of coming in close contact with the main body 100 can be increased.

Figure 4B:
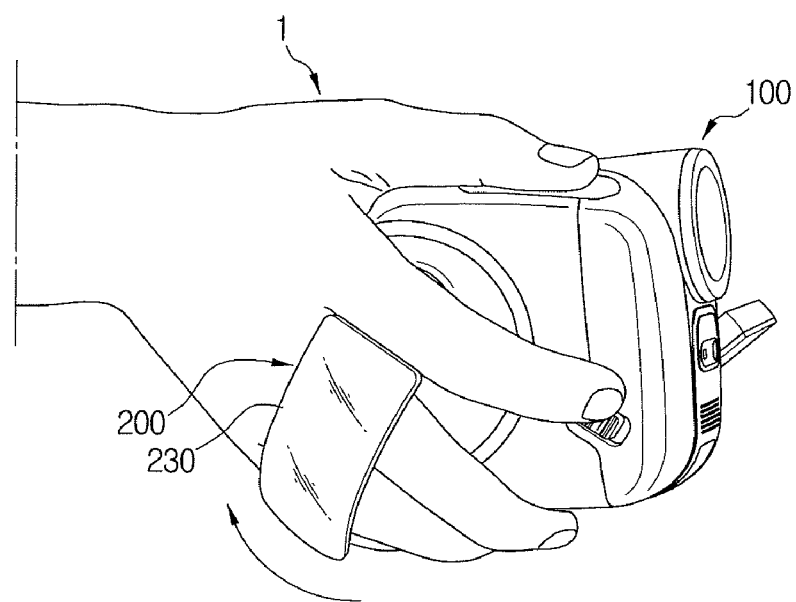

As illustrated in FIG. 4B, when a photographing posture is changed to a low angle photographing operation from the high angle photographing operation, a user can rotate the gripping unit 200 with the fingers inserted therein. In contrast, when the photographing posture is changed to the high angle photographing operation from the low angle photographing operation, the user can also rotate the gripping unit 200 with the fingers inserted therein. That is, the user can photograph while freely changing a position of her/his hand 1 according to the photographing angle in which she/he wants to photograph at, in a condition that a grasping or gripping state of the apparatus is held.

On the other hand, in a non-use situation, the image photographing apparatus can be operated to telescope the gripping unit 200, so that the gripping unit 200 does not protrude or dangle from the main body 100.

Figure 5:
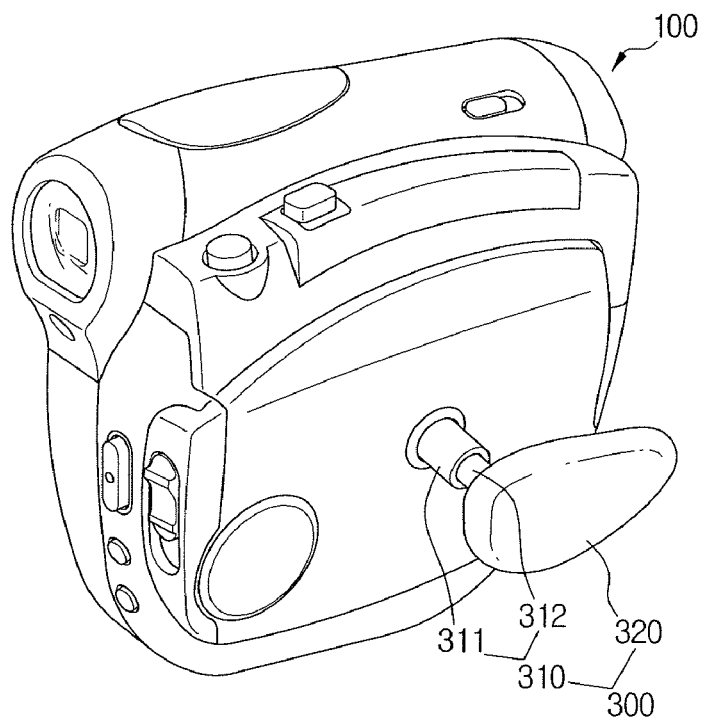
FIG. 5 is a perspective view exemplifying an image photographing apparatus according to another exemplary embodiment of the present general inventive concept.

FIG. 5 is a perspective view exemplifying an image photographing apparatus according to another exemplary embodiment of the present general inventive concept.

As illustrated in FIG. 5, the image photographing apparatus according to another exemplary embodiment of the present general inventive concept includes a main body 100, and a gripping unit 300 rotatably disposed on the main body 100.

The gripping unit 300 has a first member 310, and a second member 320.

The first member 310, as a rotary axle member that is axle-coupled with the main body 100, is disposed to project from one side surface of the main body 100 and to be rotatable thereon. The first member 310 can be made of a circular rod, an oval or a polygon having a diameter small enough to be interposed between two fingers, for example, the forefinger and the middle finger. The first member 310 is formed to adjust a length thereof in a straight direction. For instance, the first member 310 has at least two-stepped structures 311 and 312, so that it can be telescoped to extend like an antenna. Also, the first member 310 is formed to be fixed after adjusting the length thereof.

The second member 320 is fixed at approximate vertical angles to one end of the first member 310. The second member 320 can be made of a plate having a predetermined area to wrap across the middle finger, the ring finger and the little finger. The second member 320 can be formed of a curved shape having a predetermined curvature at an inner side thereof. The inside of the second member 320 can be formed of a steel material with tension and strength, so that the fingers are seated in good position on the main body 100, and a surface of the second member 320 can be formed of a rubber material, so that the fingers do not slip and the main body 100 is pleasant to the touch in a gripping operation.

Since in the image photographing apparatus according to the exemplary embodiment of the present general inventive concept as constructed and described above operates according to changes in the photographing angle similar those of the image photographing apparatus according to the exemplary embodiment explained with reference to FIGS. 4A through 4B, detailed descriptions thereof will be omitted for clarity and conciseness.

Figure 6:
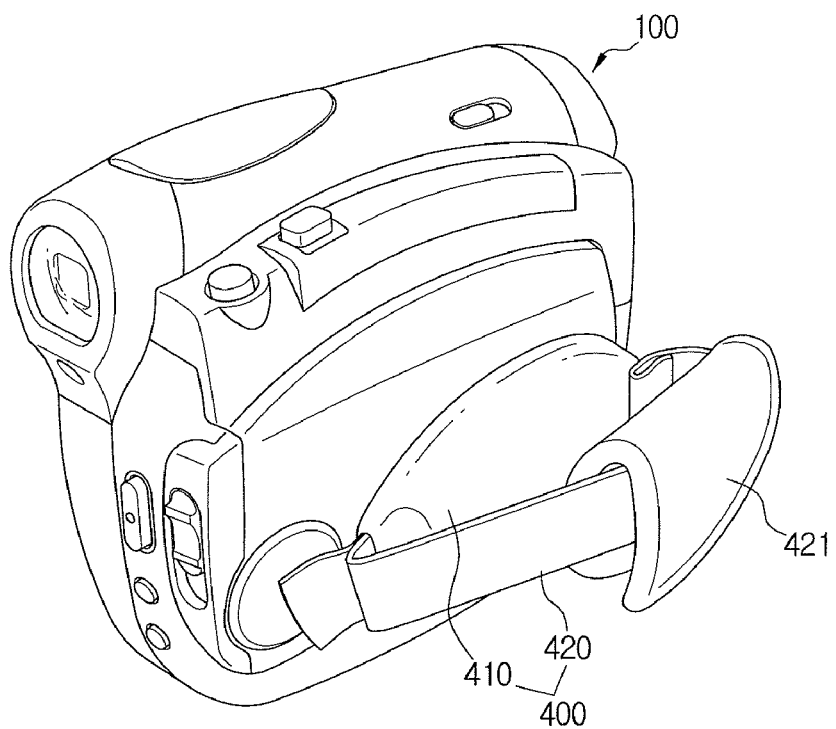
FIG. 6 is a perspective view exemplifying an image photographing apparatus according to still another exemplary embodiment of the present general inventive concept.

FIG. 6 is a perspective view exemplifying an image photographing apparatus according to still another exemplary embodiment of the present general inventive concept.

As illustrated in FIG. 6, the image photographing apparatus according this exemplary embodiment includes a main body 100 and a griping unit 400 rotatably disposed on the main body 100.

The gripping unit 400 has a rotary plate 410, and a gripping band 420.

The rotary plate 410 is rotatably disposed on one side surface of the main body 100. Here, on the rotary plate 410 is disposed a rotary axle (not illustrated), which is axle-coupled with the main body 100. The rotary axle has a gear structure, so that the rotary plate 410 is rotated in intervals of predetermined angles to the main body 100. Also, the rotary plate 410 can have a shape of a disk having a predetermined thickness. However, the rotary plate 410 is not limited to this type shape, but can be formed in a polygonal plate or the like.

The gripping band 420 is united with the rotary plate 410. The gripping band 420 can adjust a length thereof, so that user's hand 1 can be securely seated on the main body 100. Also, the gripping band 420 has a subsidiary member 421 to wrap across the back of the user's hand.

In the image photographing apparatus according to this exemplary embodiment of the present general inventive concept constructed as described above, the main body 100 can be gripped by inserting the user's hand 1 in the gripping band 420 and then adjusting the length of the gripping band 420 according to the size of the user's hand 1. Since in the image photographing apparatus according to this exemplary embodiment of the present general inventive concept operates according to changes in the photographing angle similar to those of the image photographing apparatuses according to the previously explained exemplary embodiments, detailed descriptions thereof will be omitted for clarity and conciseness.

As apparent from the foregoing description, according to the exemplary embodiments of the present general inventive concept, the image photographing apparatus allows the user to photograph freely by changing the position of her/his hand according the photographing angle that she/he wants to photograph, in the condition that the gripping state to the apparatus is held.

Also, a sense of the fingers of a user coming in close contact with the main body can be increased, and since in a non-use state of the image photographing apparatus, the gripping unit can be telescoped to avoid extending from or dangling from the main body, the user can easily carry the image photographing apparatus.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image photographing apparatus comprising:
    a main body; and
    a gripping unit fixedly mounted on the main body,
    wherein the gripping unit comprises:
        a rotary plate rotatably disposed on a side surface of the main body;
        a first member pivotably hinged to the rotary plate, a pivot axis of the first member and a rotation axis of the rotary plate being perpendicular to each other; and
        a second member hinged to the first member to be rotatable at approximate right angles with respect thereto.

2. The apparatus as claimed in claim 1, wherein the first member is formed to adjust a length thereof in a straight direction.

3. The apparatus as claimed in claim 2, wherein the first member is formed to extend telescopically.

4. The apparatus as claimed in claim 1, wherein the rotary plate comprises a rotary axle coupled to the main body.

5. The apparatus as claimed in claim 4, wherein the rotary axle includes a gear unit to rotate the rotary plate in intervals of predetermined angles with respect to the main body.

6. The apparatus as claimed in claim 4, wherein the rotary plate has a thin disk shape.

7. The apparatus as claimed in claim 1,
    wherein the first member can be disposed between two fingers of a user while the rotary plate is rotating with respect to the main body as the two fingers grip the main body.

8. The apparatus as claimed in claim 1, wherein when a user grips the gripping unit, the first member is disposed between two fingers of the user as the second member wraps over at least one of the two fingers.

* * * * *